United States Patent [19]
Buford

[11] 3,975,003
[45] Aug. 17, 1976

[54] TORCH TYPE PIPE CUTTER

[76] Inventor: Wesley E. Buford, 1042 Wingate, Covina, Calif. 91723

[22] Filed: Nov. 19, 1973

[21] Appl. No.: 417,249

[52] U.S. Cl. .................................. 266/56; 30/97; 59/93; 266/69; 266/71
[51] Int. Cl.² ........................ B23K 7/04; B23K 7/10
[58] Field of Search ............. 266/23 R, 23 L, 23 M, 266/23 N, 23 NN; 148/99.6; 33/21 C; 59/93; 30/93–102

[56] References Cited
UNITED STATES PATENTS

| | | | |
|---|---|---|---|
| 612,138 | 10/1898 | Reeve | 59/93 |
| 1,879,444 | 9/1932 | Ost et al. | 266/23 N |
| 1,886,855 | 11/1932 | Wagner | 33/21 C |
| 2,021,441 | 11/1935 | Brown | 266/23 NN |
| 2,502,660 | 4/1950 | McLean | 33/21 C |
| 2,851,265 | 7/1958 | Cink | 266/23 NN |
| 3,572,669 | 3/1971 | Brand | 266/23 NN |
| 3,700,223 | 10/1972 | Elliott | 266/23 NN |
| 3,810,359 | 5/1974 | Schreyer et al. | 59/93 |
| 3,856,283 | 12/1974 | Johnson | 266/23 NN |

FOREIGN PATENTS OR APPLICATIONS

| | | | |
|---|---|---|---|
| 349,473 | 11/1960 | Switzerland | 266/23 NN |
| 530,419 | 12/1940 | United Kingdom | 59/93 |

*Primary Examiner*—Roy Lake
*Assistant Examiner*—Paul A. Bell
*Attorney, Agent, or Firm*—William P. Green

[57] ABSTRACT

A pipe cutter including a wheeled carriage which mounts a torch and rolls circumferentially about a pipe so that the torch can progressively make a cut thereabout. The carriage may be held snugly to the pipe by a chain or rope and take-up mechanism, and be advanced about the pipe by a crank unit detachably mounted to the pipe.

16 Claims, 20 Drawing Figures

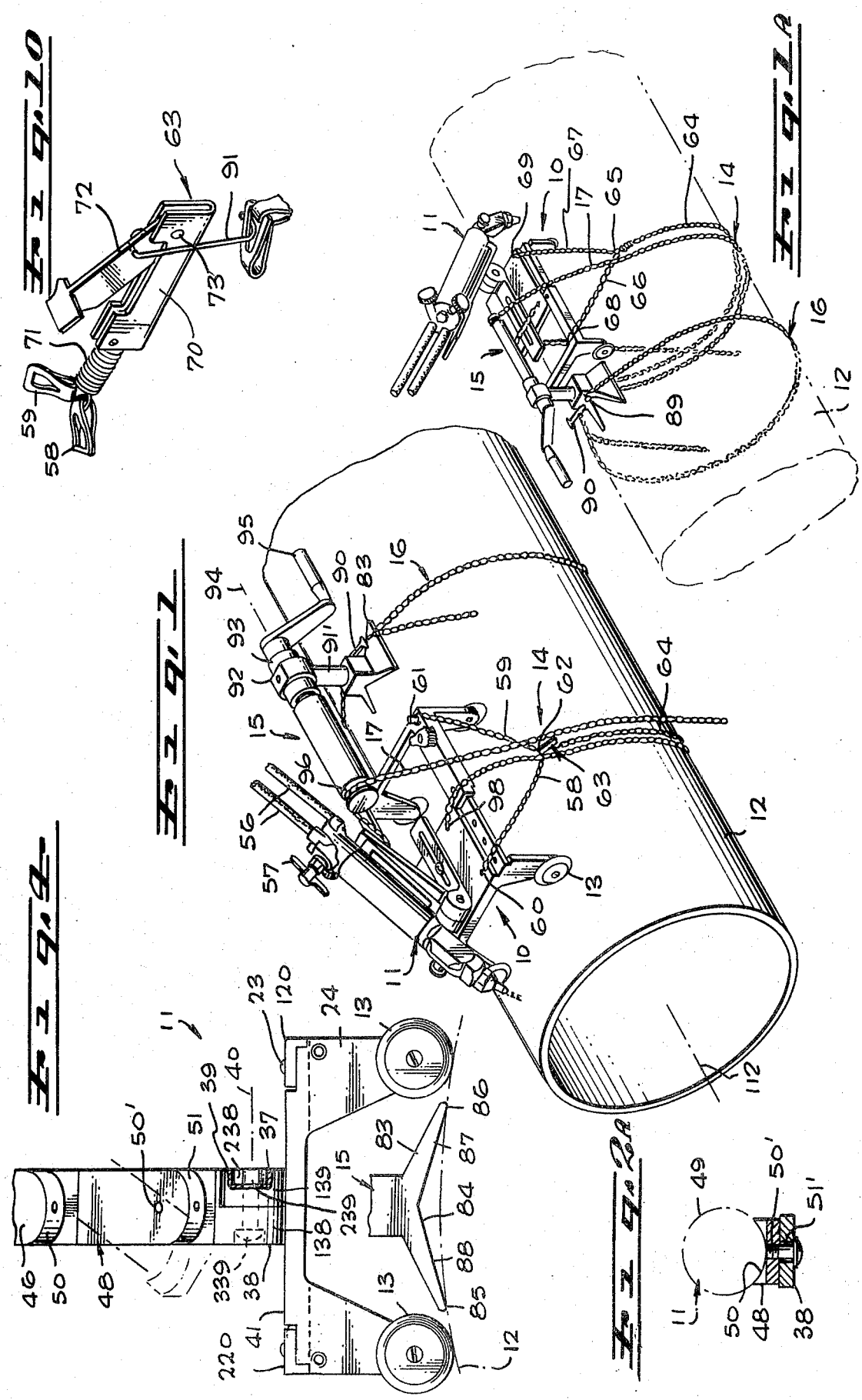

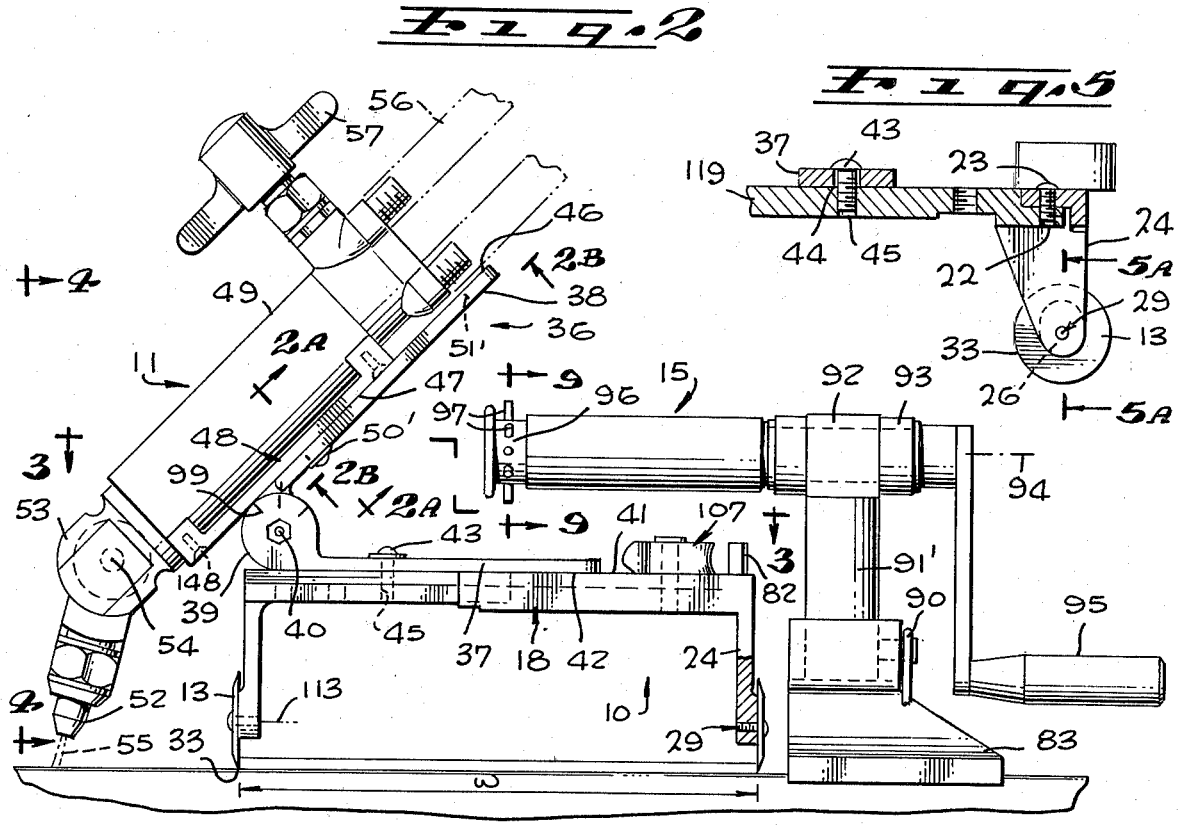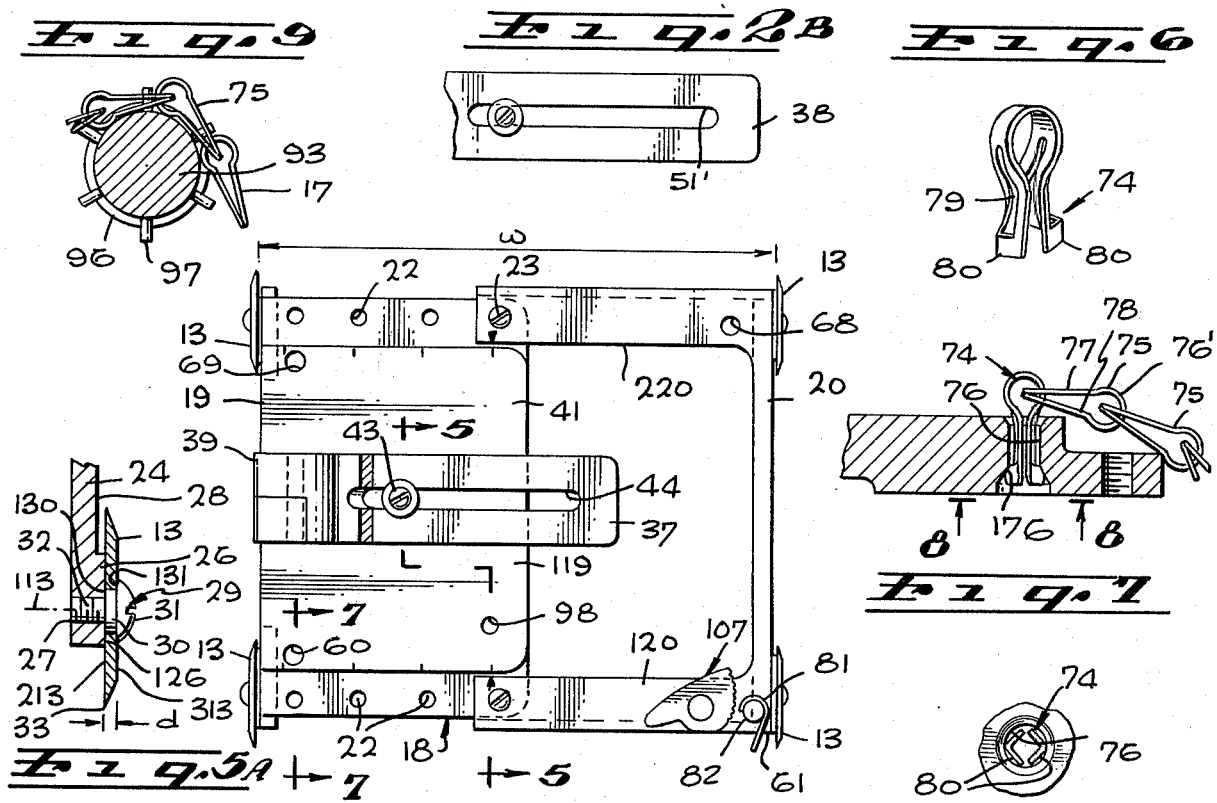

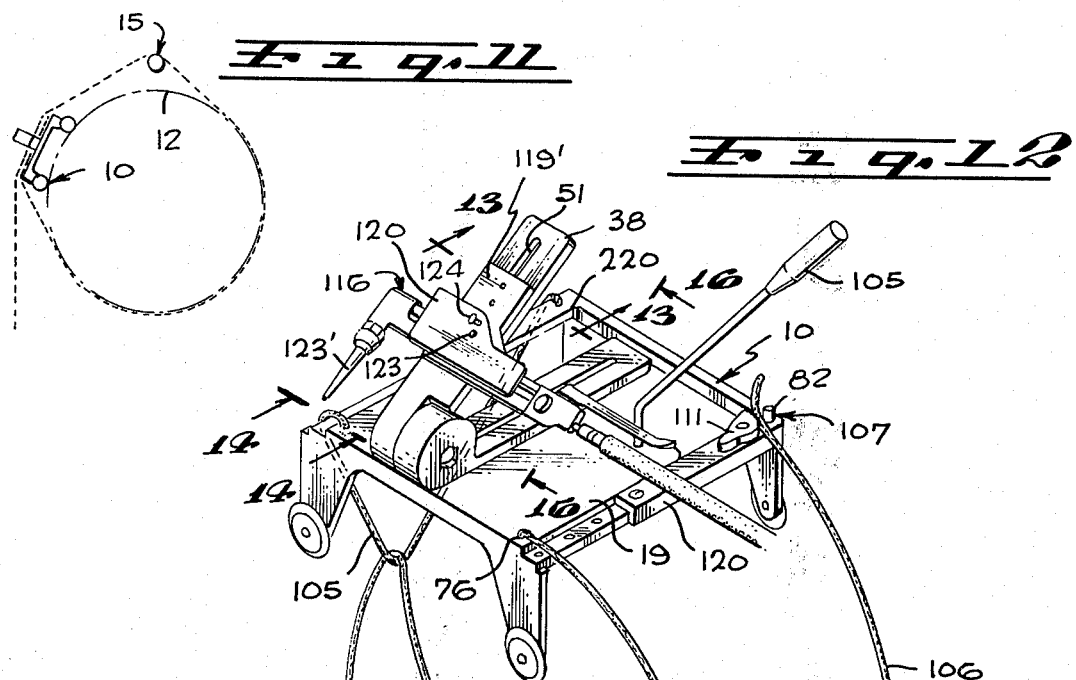
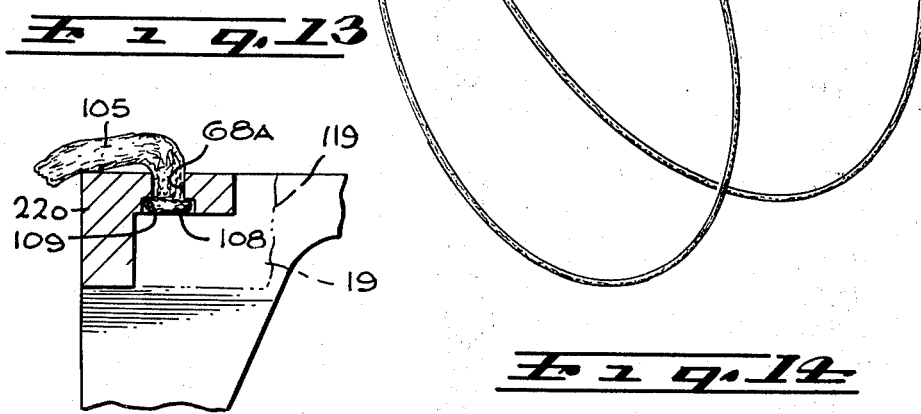
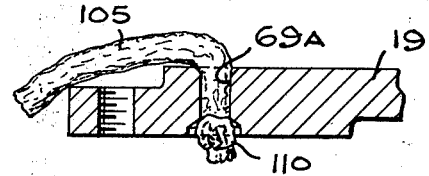
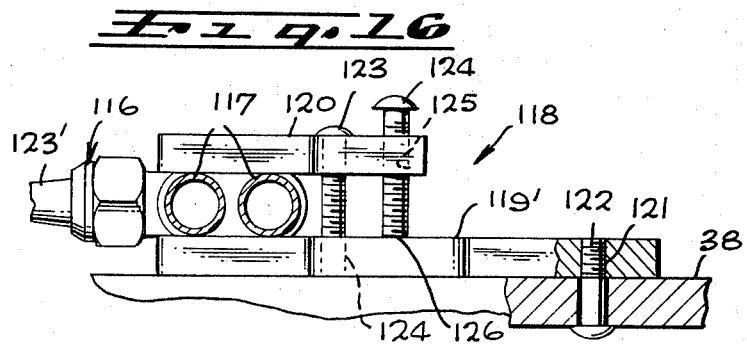
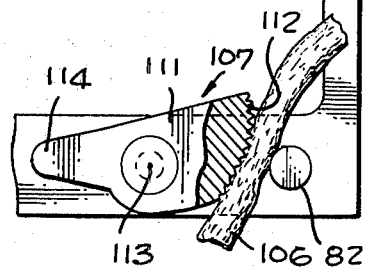

TORCH TYPE PIPE CUTTER

BACKGROUND OF THE INVENTION

This invention relates to a device for carrying a torch around a pipe in order to make an accurate circumferential cut in the pipe.

The quickest and surest prior art method of which I am aware for making such a cut incorporates a torch carriage mounted on four wheels which track along a strip of asbestos wrapped around the pipe to be cut. A cord also wrapped about the pipe holds the carriage against the pipe and in proper position over the asbestos track. The operator then moves the carriage and torch assembly manually around the pipe during the cutting operation. The torch is rigidly mounted at a fixed angle with respect to the carriage and cuts a bevelled edge on the pipe at that predetermined angle.

In use, the above discussed prior art apparatus has several drawbacks. In the first place, the necessity for initially wrapping the pipe with asbestos to form the guiding track entails the needless expenditure of a substantial amount of time and effort. The manual actuation of the carriage around the pipe can also be cumbersome and too inaccurate to provide a good cut. Finally, no adequate means has been provided for adjusting the angle between the torch's flame and the axis of the pipe to make cuts of different angularities.

SUMMARY OF THE INVENTION

The general purpose of this invention is to provide an improved pipe cutter which is of the above discussed carriage type, but is so constructed as to overcome the discussed and other drawbacks of the prior art devices. For one thing, through the use of wheels on the carriage having essentially sharp radially outer edges, the carriage in this invention tracks accurately around a pipe without the need for the asbestos wrap-around described above. The wheels may be tapered radially outwardly, with very small clearances axially in their mountings to facilitate this completely precise and accurate tracking.

A unique actuating mechanism for positively and controllably advancing the carriage around a pipe is another important feature of the invention. This drive mechanism may take the form of a crank mounted at a fixed location on the pipe and acting to pull the carriage about the pipe by force exerted through an elongated flexible member, such as a chain or cord. For best results, the chain or cord is wrapped at least one full turn around the pipe between its points of attachment to the crank and carriage. Since the movement of the carriage about the pipe can be controlled much more easily and accurately by use of a crank at a fixed readily accessible point about the periphery of the pipe than by direct manual movement of the carriage about the pipe, especially on large pipes in hard to reach areas, the present invention allows for vastly improved operation and much better results than the prior art procedures. Where the flexible drive member is a chain, a particular feature of the invention relates to provision of a novel end link for the chain, adapted to very positively secure the chain at its end to the carriage or another member during operation, and yet permit easy detachment therefrom without the need for tools.

A number of uniquely interrelated positional adjustments for the torch relative to the carriage allow the flame to be directed at virtually any desired angularity and orientation relative to the pipe. A pivotal adjustment of the angle between the flame and the axis of the pipe allows the pipe to be cut at any desired angle to the axis, while the discussed prior art device is limited to a cut of a single fixed angle. In addition, the torch of the present invention may be mounted for bodily translational movement relative to the carriage in a direction axially of the pipe, as well as other shifting and pivotal movements allowing for optimum versatility and facility of operation.

BRIEF DESCRIPTION OF THE DRAWINGS

The above and other features and objects of the invention will be better understood from the following detailed description of the typical embodiments illustrated in the accompanying drawings, in which:

FIG. 1 is a perspective view of a pipe cutter constructed in accordance with the invention, shown as it appears when mounted on a pipe during a cutting operation;

FIG. 1A is a perspective view showing the back side of the apparatus of FIG. 1;

FIG. 2 is an enlarged front elevational view of the apparatus of FIG. 1;

FIG. 2A is a fragmentary section taken on line 2A-2A of FIG. 2;

FIG. 2B is taken on line 2B-2B of FIG. 2;

FIG. 3 is a top plan view of the carriage of FIG. 2, taken primarily on the line 3—3 of FIG. 2, with the torch removed from the carriage;

FIG. 4 is a side elevational view of the carriage, taken on line 4—4 of FIG. 3, and again with the torch removed;

FIG. 5 is a fragmentary vertical section taken on line 5—5 of FIG. 3;

FIG. 5A is an enlarged fragmentary vertical section taken on line 5A—5A of FIG. 5;

FIG. 6 is a perspective representation of an end link of a chain constructed in accordance with the invention;

FIG. 7 is an enlarged fragmentary vertical section taken on line 7—7 of FIG. 3;

FIG. 8 is a fragmentary bottom plan view taken on line 8—8 of FIG. 7;

FIG. 9 is an enlarged fragmentary vertical section taken on line 9—9 of FIG. 2;

FIG. 10 is an enlarged fragmentary perspective view of the quick release overcenter chain take-up mechanism shown in FIG. 1;

FIG. 11 is a somewhat diagrammatic side view of the apparatus of FIG. 1 during a cutting operation;

FIG. 12 is a perspective view similar to FIG. 1 of a variational form of the invention;

FIG. 13 is an enlarged fragmentary vertical section taken on line 13—13 of FIG. 12;

FIG. 14 is an enlarged fragmentary vertical section taken on line 14—14 of FIG. 12;

FIG. 15 is an enlarged fragmentary plan view of a cord retaining element of FIG. 12; and FIG. 16 is an enlarged fragmentary vertical section taken on line 16—16 of FIG. 12.

DESCRIPTION OF THE PREFERRED EMBODIMENTS

As seen best in FIGS. 1 and 1A, a first form of pipe cutter embodying the invention includes a carriage 10 mounting a torch 11 for movement circumferentially about a pipe 12 in a cutting operation. Carriage 10 is equipped with four wheels 13 which roll along the outside of the pipe, and is held snugly against the pipe by a chain assembly 14. A crank assembly 15 is detachably secured to pipe 12 by a chain assembly 16 and is used to actuate the carriage about the pipe by pulling force exerted through a chain 17.

FIGS. 2 through 5 show the carriage in more detail. This carriage has a main body 18 consisting of two sections 19 and 20, whose attachment is adjustable to vary the width of the carriage between its two pairs of wheels at opposite sides of the carriage. To permit such adjustment, section 20 may have two parallel front and rear arms 120 and 220 extending along the front and rear edges respectively of a horizontal portion 119 of section 19, and containing circular openings through which a pair of screws 23 can extend in closely fitting relation for connection into any of several pairs of threaded openings 22 spaced across the width of section 19. The two body sections can therefore be adjusted to any one of several (typically four) combined widths, and be rigidly retained in those different widths by screws 23. Each of the two carriage sections 19 and 20 has two legs 24 projecting downwardly from its outer edge and mounting two of the wheels 13 with their axes 113 parallel to the axis 112 of pipe 12. Legs 24 may be essentially planar as shown, with internally threaded openings 27 for reception of screws 29 to attach wheels 13 to the legs. Non-circular bosses 26 are formed on the outer faces 28 of legs 24, about openings 27, to space the wheels slightly away from other portions of the legs. As seen in FIG. 5, bosses 26 may extend slightly farther above openings 27 than below, to optimize stability of the wheels under load, while keeping friction to a minimum. The outer surfaces 126 of bosses 26 are planar and disposed perpendicular to axes 113 of the screws and engage and movably contact and locate corresponding planar transverse surfaces 213 on the wheels. Each screw 29 may have a cylindrical portion 30 extending axially between its head 31 and threaded portion 32, and serving as an axle for the associated wheel 13. A transverse shoulder 130 at the end of surface 30 engages boss 26 in a relation spacing the inner transverse planar surface 131 of screwhead 31 from surface 126 a very precisely measured distance $d$ corresponding almost exactly to the axial thickness of wheels 13 between their opposite side planar surfaces 213 and 313. Preferably, the spacing between surfaces 131 and 126 is only sufficiently greater than the thickness of the wheels to permit free rotation of the wheels (desirably about 0.002 inches greater) while avoiding any lateral shifting movement of the wheels and thereby controlling very precisely and positively the positions of the wheels on the carriage.

To assure accurate tracking of the wheels about the pipe, without use of a guiding wraparound on the pipe, the wheels are provided with outer annular edges 33 which are essentially sharp as shown. The peripheral portions of the wheels may be tapered radially outwardly toward edges 33 as seem in FIG. 5A, by provision of an annular angularly disposed surface at the axially outer side of each wheel, or by provision of two oppositely inclined angular surfaces at the two sides respectively of the wheel.

The torch 11 is mounted adjustably to carriage 10 by a unique pivotal bracket or hinge unit 36, including two rigid elements 37 and 38 interconnected by a hinge connection 39 for relative swinging movement about a pivotal axis 40. Element 37 exxtends along the upper planar surface 41 of section 19 of the carriage body, and has a planar horizontal undersurface 42 engaging and located by surface 41, and is retained downwardly against section 19 by a screw 43 extending downwardly through an elongated slot 44 formed in element 37 and connecting threadedly into an opening 45 in portion 119 of section 19. When screw 43 is loosened slightly, element 37 may be adjusted in a left to right direction as viewed in FIGS. 2 and 3, or pivotally about the axis of screw 43 to any desired angularity, and then be retained in a set position by tightening the head of screw 43 downwardly against the upper surface of element 37.

The second element 38 of bracket 36 is mounted by hinge joint 39 to swing upwardly and downwardly toward and away from element 37 and carriage section 19, to vary the angularity of element 38 and the carried torch 11 with respect to the axis of pipe 12. Preferably, this swinging movement of element 38 and the torch relative to element 37 and the carriage enables element 38 to swing between a lowered horizontal position of parallelism with respect to element 37 and an upwardly projecting vertical position of perpendicularity with respect to element 37, to thereby adjust the body of the torch through 90° with respect to the carriage.

The upper surface 46 of element 38 may be planar, and engage a correspondingly planar undersurface 47 of a cradle element 48 to which the essentially cylindrical main body 49 of torch 11 is mounted. At its upper and lower ends, cradle element 48 has portions 50 and 51 which are recessed in the manner illustrated in FIG. 2A to receive and embrace the main body portion 49 of the torch in a confining and accurately locating relation. The torch may be retained in this fixed position relative to the cradle by a pair of screws 148 (FIG. 2) extending upwardly through the cradle from its underside and connecting into the body of the torch. Adjustment of the cradle and torch relative to bracket element 38 is permitted by connecting element 48 to element 38 by a single screw 50' extending through an elongated slot 51' in element 38 and connecting into a threaded opening in the base of element 48. As in the case of the screw 43, this single screw attachment at 50' enables the cradle 48 to be slid longitudinally of element 38, by movement of screw 50' along slot 51', and to also be cocked to different positions by pivotal movement of cradle 48 and the torch about the axis of screw 50' relative to element 38. The parts may be locked in any desired orientation by tightening of the head of screw 50' against element 38.

To further adjust the positioning of the torch flame relative to pipe 12, the flame emitting nozzle 52 of the torch may be mounted to torch body 49 by a pivotal connection 53 (FIG. 2) for swinging movement about an axis 54 relative to the torch body. Thus the flame 55 may be set to any desired angularity to form a bevelled edge of any type, or a straight edge on the pipe. Oxygen and acetylene, or other selected gases, are fed to the torch in conventional manner by hoses represented at 56, under control of a valve or valves 57. The hinge connection 53 between nozzle 52 and the body 49 of the torch is a swivel type connection capable of conducting to the nozzle from body 49 whatever gas or gasses are employed for producing the flame.

The chain assembly 14 for holding carriage 10 snugly against the outer surface of pipe 12, as the carriage advances circularly about the pipe, may include two relatively short chains 58 and 59 secured to two leading corners of the carriage at 60 and 61 respectively, and having their second ends connected at 62 to a take-up unit 63 typically of the overcenter type. This unit 63 in turn connects both of the chains 58 and 59 to a third chain 64, which extends about the pipe 12 for connection at its opposite end 64 through two additional chains 66 and 67 to the two trailing corners 68 and 69 respectively of the carriage (see FIG. 1A). The overcenter take-up unit is illustrated best in FIG. 10, which shows it as including a first part 70 connected to chains 58 and 59, preferably through a coil spring 71, and a swinging arm 72 pivoted at 73 to swing relative to part 70 to a slightly overcenter position locking chain 64 and the connected chains tightly about the pipe to hold the carriage wheels 13 snugly against the pipe surface. Spring 71 can be yieldingly extended during the final portion of the swinging movement of arm 72 of the overcenter take-up unit, to assure a taut condition of the chain assembly about the pipe.

The chains 58, 59, 64, 66 and 67 are desirably of a known type illustrated in FIGS. 6 and 7, except that certain of the end links 74 of certain of the chains are deformed to a condition somewhat different than the remainder of the links 75, in a manner enabling those end links 74 to be frictionally received and retained within coacting vertical passageways 76 formed in carriage parts 19 and 20. Each of the links of the chain is formed of a single elongated piece of sheet metal doubled back to form a return bend at 76', and to form two generally parallel arms 77 and 78 containing apertures 79 through which the return bend portion 76' of the next successive link extends. The end links are deformed so that the extremities 80 of the two arms 77 and 78 are bent slightly away from one another, to each preferably form a right angle as viewed in FIG. 8, so that the two end portions 80 together form a generally square cross section having normal size slightly greater than the transverse dimension of passageway 76, requiring extremities 80 to be deformed slightly radially inwardly, against the resilience of the material of which they are formed, in order to be forced downwardly into passageway 76 and thereby be frictionally locked in the FIG. 8 position in the passageway, in which position extremities 80 are desirably expanded slightly into an enlarged flaring lower portion 176 of passage 76. Since the pulling force exerted by the remainder of the chain is at a slightly downward angle as viewed in FIG. 7, this frictional engagement of the end links to the chain is sufficient to hold the chain in a position of connection to the carriage, without any tendency for the longitudinal force exerted on the chain to pull the end links out of their coacting passages 76. Desirably, connections of this type between the chain ends and the carriage are provided at the three locations 60, 68 and 69, while a hook 81 is provided at the fourth point of connection 61, with the hook being removably receivable about an upstanding post 82 carried by carriage section 20.

The crank mechanism 15 for advancing carriage 10 and the carried parts about the pipe includes a base element 83 (FIG. 2), having an undersurface 84 which is recessed to engage the outer surface of pipe 12 at two spaced locations 85 and 86 (FIG. 4), and thereby embrace a portion of the outer surface of pipe 12 in a manner locating base 83 on that outer surface. As seen in FIG. 4, the concavity of undersurface 84 of base 83 may be defined by two angularly disposed surface areas 87 and 88, extending at an angle to engage and embrace any of various different sizes of pipe along two parallel regions of the surfaces 87 and 88 respectively, so that the base can be effectively mounted on those different sizes of pipe.

The chain 16 for holding base 63 on the pipe may be the same known type of inexpensive chain described hereinabove, having one end attached to base 83 at 89 (FIG. 1A), and connected near its opposite end to the base by a quick release overcenter take-up mechanism 90 similar to that disclosed in FIG. 10, and preferably having a spring associated therewith as shown at 71 in FIG. 10. Any appropriate link of the chain 16 may be connected detachably to the overcenter mechanism 70, as by hook element as represented at 91 in FIG. 10, to give the chain 16 the appropriate length for extending tightly about pipe 12 and securing base 83 thereagainst.

Projecting upwardly from base 83, the crank assembly 15 has a rigid post 91, mounting a bearing 92 which journals a shaft element 93 for rotation relative to elements 83, 91 and 92 about an axis 94 extending parallel to axis 112 of pipe 12. A crank 95 at the outer end of shaft 93 turns the shaft about axis 94. At its opposite or inner end, shaft 93 has a sprocket portion 96 (FIG. 9), having a series of evenly circularly spaced outwardly projecting lugs or pins 97. The chain 17 engages this sprocket portion 96 of shaft 93, and is driven thereby, to mechanically advance carriage 10 about the pipe. Chain 17 may be the same type of chain previously discussed, and illustrated in FIGS. 6 and 7, with the openings 79 of the various links of the chain receiving pins 97 of the sprocket wheel element 96, to advance the chain in correspondence with rotation of the sprocket wheel. One end of the chain 17 is connected at 98 to carriage 10, by reception of a deformed end link as previously discussed within a vertical passage in the carriage. From that location 98, the chain 17 initially extends entirely about pipe 12, through somewhat more than 360°, and then is passed over and engaged with the sprocket wheel 96, for actuation thereby.

To now describe a cycle of use of the above discussed apparatus of FIGS. 1 through 10, a first step is to place carriage 10 on the pipe which is to be cut in the position of FIG. 1, and to then connect the various chains 58, 59, 64, 66 and 67 to the carriage as shown. The hook element 91 of overcenter take-up unit 63 is connected to whatever link of chain 64 is necessary in order for the chain assembly to snugly fit the pipe. Thereafter, the arm 72 of take-up unit 63 is swung to its locked position, to cause the chain to tightly embrace the pipe and hold the carriage snugly against the outer surface of the pipe.

With the carriage thus located, hinge bracket 36 is adjusted to lock element 38 and the body of torch 49 in a set inclination with respect to the carriage and pipe, as indicated by coacting angularity markings provided at 99 on parts 38 and 39 near the hinge axis. These markings may indicate any of various angularities such as 30°, 37½°, 45°, 60°, 90°, etc. The hinge joint 39 is formed as two aligned tubular lugs 138 and 139 formed on parts 38 and 39 respectively and interconnected pivotally by a screw 239 which acts when tightened relative to a nut 339 to lock the joint in any set position. The nut may be retained against rotation relative to part 38 by reception within a hexagonal recess 238. Further adjustment of the position of the flame 55 may be effected by shifting part 37 longitudinally or pivotally as previously discussed, or by shifting part 48 longitudinally or pivotally relative to part 38 as discussed, or by swinging nozzle 52 to different settings relative to the body 49 of the torch. Thus, any orientation of the flame relative to the pipe can be attained without requiring very precise positioning of the carriage itself, or bodily shifting movement of the carriage on the pipe.

After the carriage and torch have been set as discussed, the crank assembly 15 is attached to the outer surface of the pipe by chain 16, and the chain 17 is connected to carriage 10 at 98 and then passed about the pipe and about sprocket wheel portion 96 of the crank assembly. The operator can then actuate crank 95 to exert a pulling force on chain 17 acting to gradually but positively pull carriage 10 circularly about the pipe at any desired rate which may be required to produce a proper cut. The sharp edges 33 of the wheels are able to track very effectively about the pipe, and by virtue of the four point engagement of these sharp edges guide the carriage for movement in a plane disposed precisely perpendicularly with respect to the axis 112 of the pipe, to thus form an accurate transverse in the pipe. This cut is more accurate than has been possible by prior methods, and yet can be made in a much shorter interval of time than has been heretofore possible.

FIGS. 12 through 16 illustrate a variational arrangement, in which the carriage 10 may be the same as that previously described and shown in FIGS. 1 to 11, but in lieu of the crank assembly 15, there is provided on the carriage an upstanding handle 105, whose lower end may be threadedly connected into an opening in section 19 of the carriage. Also, instead of the retaining chains of the first form of the invention, the FIGS. 12 through 16 arrangement utilizes two cords or ropes 105 and 106 for extension about the pipe to be cut. Rope 105 may have its opposite ends connected into passages 68A and 69A at the previously mentioned locations 68 and 69 respectively of FIG. 9, while cord 106 may have a first of its ends connected into the previously mentioned passage 76 in part 19, and have a second end adjustably and releaseably retained by a camming locking mechanism 107. More particularly, at the location of passage 68A in FIG. 13, the cord 105 may have a shallow enlargment 108 at its end, receivable within a shallow recess 109 formed in the underside of arm 220 of section 20 of the carriage. This reception of enlargement 108 within recess 109 allows the enlargement 108 to be received upwardly above the plane of the upper surface of part 19 when the carriage sections 19 and 20 are adjusted to their minimum width condition in which part 119 is slidably received beneath arm 220 (broken lines in FIG. 13). The other end of cord 105 may extend downwardly through the passage 69A and have a knot 110 formed at the underside of part 19, to thereby positively secure both ends of cord 105 to one end of the carriage. The connection of cord 106 at 76 can be the same as that illustrated in FIG. 14. The connection at 107 is illustrated best in FIG. 15, and includes a camming locking part 111 having a toothed surface 112 which advances progressively away from pivotal axis 113 of part 111 as the toothed surface 112 advances circularly (upwardly in FIG. 15). The cord 106 is clamped between these teeth and the previously mentioned cylindrical upstanding post 82 of the carriage, to lock the cord in any set position. A handle portion 114 of element 111 may project in the opposite direction to enable easy manual pivotal movement of element 111 in a releasing direction. An appropriate spring may be provided to yieldingly urge part 111 pivotally in a clockwise direction as viewed in FIG. 15, and to its active holding position.

The torch 116 illustrated in FIG. 12 is a more conventional torch than that shown in FIGS. 1 to 11, and specifically includes two parallel rigid acetylene and oxygen supplying tubes 117 (FIG. 16). For holding this torch in position, I provide a clamp or holder unit 118, having a first rigid plate 119' received adjacent hinge part 38, and a second and essentially parallel upper or outer plate 120 spaced from plate 119'. The plate 119' is secured to swinging hinge element 38 by a screw 121 extending through the slot 51 of part 38 in the same manner discussed previously in connection with screw 50 of FIG. 2, and threadedly connected into plate 119' at 122. A screw 123 extends downwardly through plate 120 and threadedly connects into plate 119' at 124, to pull plate 120 downwardly toward plate 119' in a manner clamping tubes 117 of the torch between the two plates. A second screw 124 extends through a threaded aperture 125 in a right hand portion of plate 120 as viewed in FIG. 16, and bears downwardly against the upper surface of plate 119' at 126, so that downward tightening of screw 124 relative to plate 120 acts to force the right hand portion of plate 120 upwardly and force the left hand portion of plate 120 downwardly, so that the two screws 123 and 124 may by appropriate adjustment tighten plate 120 downwardly in exact parallelism with plate 119', to thereby tightly grip both of the two tubes 117. The nozzle 123' of torch 116 is aimed downwardly toward the pipe, to form a cut therein corresponding to the angularity of portion 38 of the hinged mounting bracket.

In using the arrangement of FIGS. 12 through 16, the carriage is positioned on the pipe 12 in generally the same manner as FIG. 1, but with the two cords 105 and 106 extending about the pipe in lieu of the previously discussed chains, and with cord 106 being tightened at 107 to a condition holding the carriage snugly against the pipe. The operator may then gradually advance the carriage manually about the pipe by pushing on handle 105 of the carriage, with the sharp wheels again assuring accurate tracking of the carriage about the pipe, and therefore assuring formation by the torch of a precisely annular cut in the pipe.

While certain specific embodiments of the present invention have been disclosed as typical, the invention is of course not limited to these particular forms, but rather is applicable broadly to all such variations as fall within the scope of the appended claims.

I claim:

1. A pipe cutter including a carriage for carrying a torch circumferentially about the pipe, said carriage including two body sections, two sets of wheels on said body sections respectively for rolling about the surface of the pipe, and means interconnecting said two sections for relative adjusting movement of different relative positions in which said two sets of wheels are spaced different distances apart axially of the pipe.

2. A pipe cutter as recited in claim 1, in which said last mentioned means include engaging portions of said two body sections relatively shiftable slidably to different relative settings for adjusting the relative spacing of said sets of wheels, and fasteners operable to connect said sections together in said different settings thereof.

3. A pipe cutter as recited in claim 2, in which said fasteners extend through apertures in one of said sections and connect threadedly into any of different threaded openings formed in the other section.

4. A pipe cutter as recited in claim 1, in which said interconnecting means include two arms carried by a first of said sections and projecting therefrom generally parallel to one another and toward the second section, means forming two spaced essentially parallel guideway grooves in said second section receiving said two arms respectively in any of different adjusted positions in which said two sets of wheels are spaced different distances apart, and fasteners for interconnecting said arms and said second section in any of said different relative positions.

5. A pipe cutter as recited in claim 4, in which said fasteners are screws extending through apertures in said arms and connectible into any of different registering apertures formed in said second section within said grooves to releasably retain the two sections in different adjusted positions.

6. A pipe cutter including a carriage for carrying a torch and having wheels which roll circumferentially about the outer surface of a pipe to form a circumferential cut therein, and an elongated chain encircling said pipe with each end thereof connected to said carriage for controlling the positioning and movement of said carriage relative to said pipe and having a series of identical links each formed by doubling back a single piece of material to form a return bend and two arms projecting in generally parallel relation therefrom, with said arms containing apertures through which the return bend of the next successive link extends, said chain having an end link in which said two arms are deformed farther apart than the corresponding arms of other links of the chain and are receivable in a recess or opening in said carriage in frictional retaining relation.

7. A pipe cutter as recited in claim 6, in which said arms of said end link are deformed to form together an essentially square cross-section, said arms being slightly resiliently deformable to frictionally engage said recess or opening in the carriage.

8. A pipe cutter comprising:
a carriage adapted to carry a torch circumferentially about a pipe;
an actuating unit to be mounted at a fixed location on the pipe; and
an element extending from said actuating unit to said carriage and acting to advance the carriage about the pipe;
said element being an elongated flexible element extending about said pipe and exerting a pulling force on the carriage for advancing it circularly about the pipe.

9. A pipe cutter as recited in claim 8, in which said element is an elongated flexible chain extending about the pipe and exerting a pulling force on the carriage.

10. A pipe cutter as recited in claim 8, in which said element is an elongated flexible cord extending about the pipe and connected to said carriage to exert a pulling force theron.

11. A pipe cutter as recited in claim 8, including a second elongated flexible member extending about said pipe and holding the carriage snugly thereagainst.

12. A pipe cutter as recited in claim 8, in which said actuating unit includes a rotary element operable upon rotation to advance said flexible element and thereby said carriage about the pipe.

13. A pipe cutter as recited in claim 8, in which said actuating unit includes a part, means for mounting said part at said fixed location on the pipe, and a rotary element carried movably by said part of acting against said flexible element to exert pulling force thereagainst and advance it and the carrige circularly about the pipe.

14. A pipe cutter as recited in claim 8, in which said actuating unit includes a base part adapted to locally engage and embrace a portion of the outer surface of said pipe, a second flexible element connected at opposite ends to said base part and extending about the pipe to secure said base part thereagainst, and a member mounted movably to said base part thereagainst, and a member mounted movably to said base part and acting against said first mentioned flexible element to exert pulling force thereagainst and advance it and the carriage about the pipe.

15. A pipe cutter comprising:
a carriage adapted to carry a torch circumferentially about a pipe;
an actuating unit to be mounted at a fixed location on the pipe; and
an element extending from said actuating unit to said carriage and acting to advance the carriage about the pipe;
said element being elongated flexible element extending circularly about the pipe and connected to said carriage to exert a pulling force thereon for advancing it circularly about the pipe;
said actuating unit including a mounting part, means for securing said mounting part at said fixed location on the pipe, and a crank member mounted rotatably to said mounting part and having a portion acting against said flexible element to exert a pulling force thereon for advancing the carriage about the pipe.

16. A pipe cutter comprising:
a carriage adapted to carry a torch circumferentially about a pipe;
an actuating unit to be mounted at a fixed location on the pipe; and
an element extending from said actuating unit to said carriage and acting to advance the carriage about the pipe;
said actuating unit including a base part adapted to locally engage and embrace a portion of the outer surface of said pipe, a flexible element connected at opposite ends to said base part and extending about the pipe to secure said base part thereagainst, and a crank mounted rotatably to said base part;
said first mentioned element being an elongated flexible element extending about said pipe and connected to said carriage and operatively engaging said crank for advancement about the pipe by the crank.

* * * * *